(12) United States Patent
Fontaine

(10) Patent No.: US 6,737,595 B1
(45) Date of Patent: May 18, 2004

(54) UNITARY SEAT SWITCH ASSEMBLY

(76) Inventor: William G. Fontaine, 2676 SW. 15th St., Deerfield Beach, FL (US) 33442

( * ) Notice: Subject to any disclaimer, the term of this patent is extended or adjusted under 35 U.S.C. 154(b) by 0 days.

(21) Appl. No.: 10/403,560

(22) Filed: Apr. 1, 2003

(51) Int. Cl.[7] ............................................. H01H 9/00
(52) U.S. Cl. ................................. 200/85 A; 200/85 R
(58) Field of Search ..................... 200/85 R–85 A, 200/511, 512

(56) References Cited

U.S. PATENT DOCUMENTS

| | | | | |
|---|---|---|---|---|
| 3,305,724 A | * | 2/1967 | Shaheen ................... | 307/10.1 |
| 5,006,771 A | * | 4/1991 | Ogasawara ............... | 318/568.1 |
| 5,967,608 A | * | 10/1999 | Van Sickle ............... | 297/284.6 |
| 6,369,529 B1 | * | 4/2002 | McClintock et al. ......... | 318/16 |
| 6,523,417 B1 | * | 2/2003 | Donahue et al. ............ | 73/800 |

* cited by examiner

*Primary Examiner*—Michael A. Friedhofer
(74) *Attorney, Agent, or Firm*—Oltman, Flynn & Kubler

(57) ABSTRACT

A unitary switch assembly comprising a seat switch component with a normally-open seat switch that closes under the weight of a person in the driver's seat of a vehicle, and a thermistor component with a thermistor having a permanent electrical connection to the seat switch, enabling the seat switch and thermistor components to be handled as a unit.

3 Claims, 2 Drawing Sheets

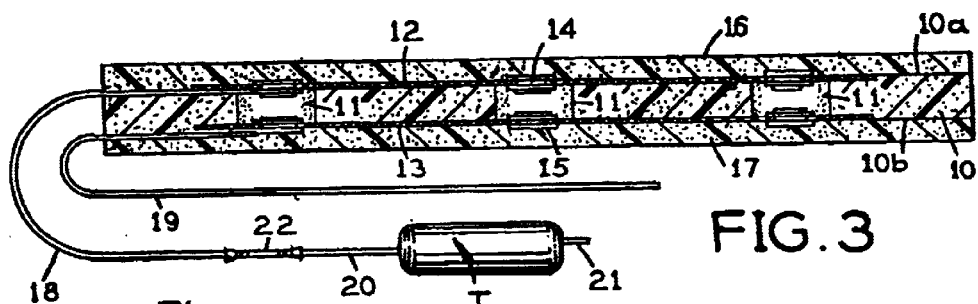
FIG. 3
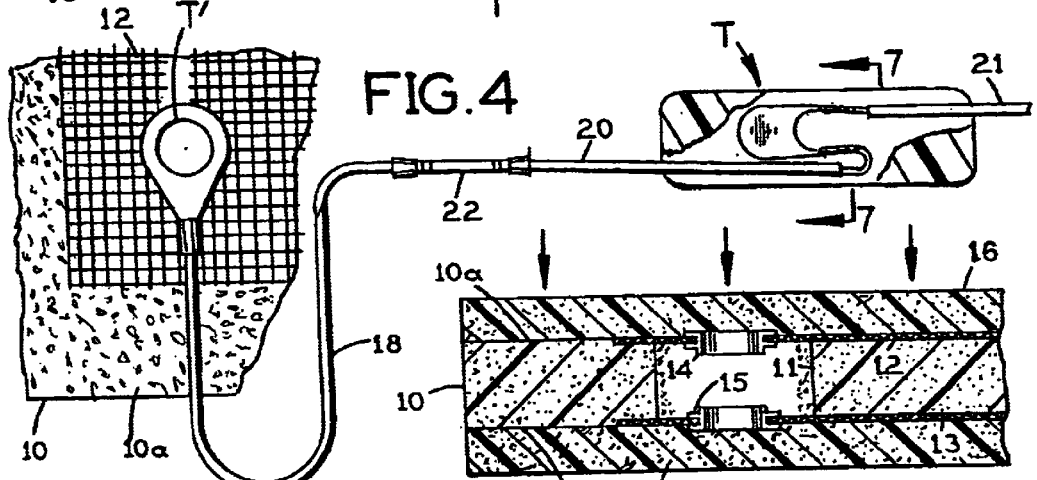
FIG. 4
FIG. 5
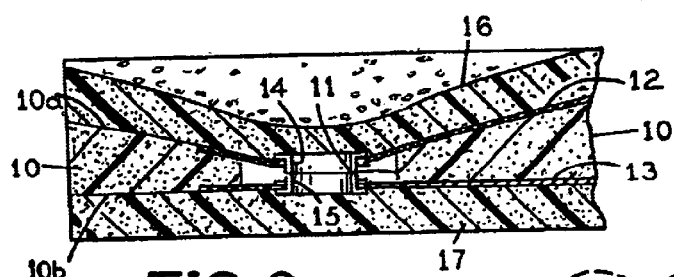
FIG. 6
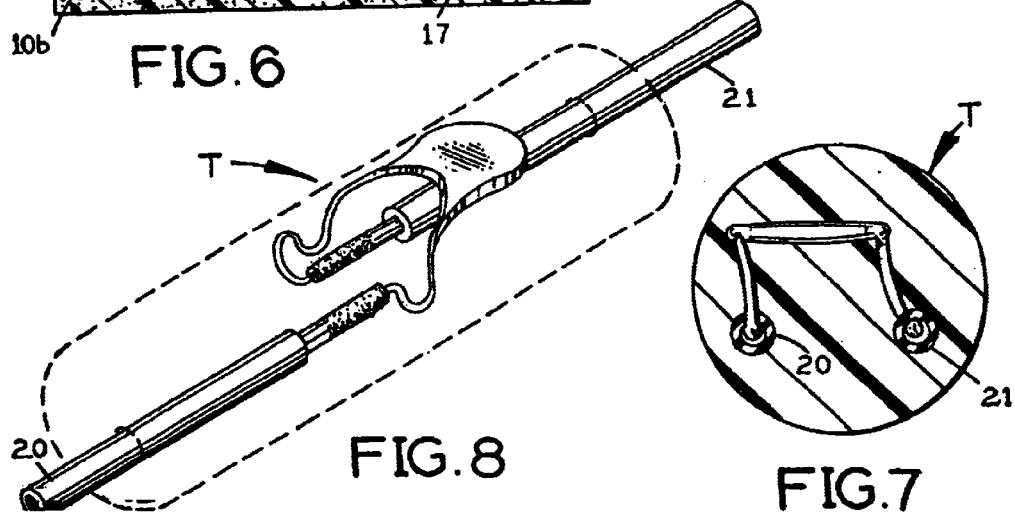
FIG. 8
FIG. 7

UNITARY SEAT SWITCH ASSEMBLY

BACKGROUND OF THE INVENTION

1. Field of the Invention

This invention relates to a unitary seat switch assembly having current overload protection.

2. Prior Art

U.S. Pat. Nos. 3,487,451, 3,704,352 and 3,860,773 to John G. Fontaine and U.S. Pat. No. 4,572,319 to William G. Fontaine show various embodiments of a vehicle seat switch positioned in the driver's seat of a motor vehicle, such as a car, truck, or golf cart, to be closed by the weight of a person on the driver's seat and to open automatically when the person leaves the seat. The seat switch may control vehicle brakes, the emergency or parking brake, seat belts, headlights, windshield wipers, or other vehicle components.

Thermistors have been used heretofore for various purposes. The thermistor is a polymeric switch device with a positive temperature coefficient; its resistance increases greatly in response to an overtemperature or overcurrent condition, such as might be caused by a short circuit in some part of the circuit in which the thermistor is connected. In this respect the thermistor can be said to act like a fuse, but it differs from a conventional fuse in that it resets automatically (i.e., resumes its normal low resistance state) when the circuit is de-energized.

SUMMARY OF THE INVENTION

The present invention is directed to a novel and advantageous unitary combination of a seat switch and a thermistor that provides overload protection for the electrically operated vehicle component or components controlled by the seat switch and enables a service technician to identify and replace or repair of the faulty device that caused the overload without having to remove the seat switch and thermistor unit from the driver's seat unless it is determined that the fault is in the seat switch.

Further objects and advantages of this invention will be apparent from the following detailed description of a presently preferred embodiment thereof, with reference to the accompanying drawings.

BRIEF DESCRIPTION OF THE DRAWINGS

FIG. 3 is a diagonal cross-section through the seat switch component of FIGS. 1 and 2, taken along the line 3—3 in FIG. 2, and connected to the thermistor component of the present asembly;

FIG. 4 shows the thermistor in the present assembly partly broken away and connected to one of the upper contacts of the seat switch;

FIG. 5 is a fragmentary cross-section through the seat switch component showing one pair of its upper and lower contacts separated (i.e., when a person is not on the seat in which the seat switch assembly is positioned);

FIG. 6 is view similar to FIG. 5 and showing these contacts engaging one another (i.e., when the weight of a person on the seat closes the seat switch);

FIG. 7 is a cross-section through the thermistor in the present assembly, taken along the line 7—7 in FIG. 5; and FIG. 8 is a perspective view of the operating parts of the thermistor, with its casing shown in phantom.

DETAILED DESCRIPTION OF THE INVENTION

Before explaining the present invention in detail it is to be understood that the invention is not limited in its application to the particular arrangement shown and described since the invention is capable of other embodiments. Also, the terminology used herein is for the purpose of description and not of limitation.

Figure 1:
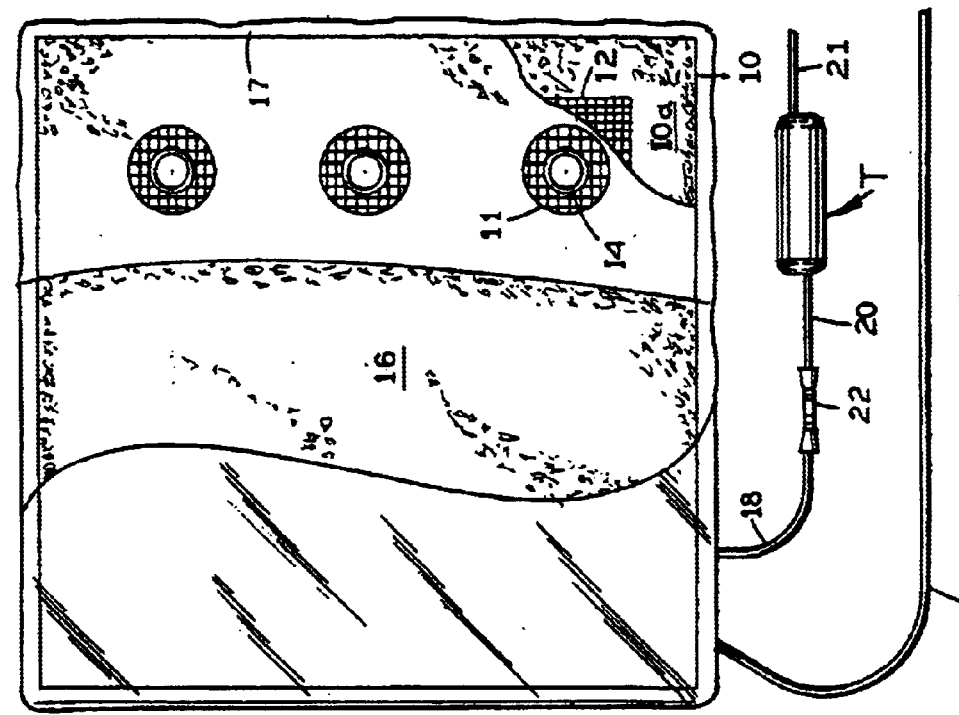
FIG. 1 is a bottom plan view of the seat switch component of the present assembly with its bottom cover pad removed, as well as the thermistor component connected in circuit with this seat switch component in accordance with a preferred embodiment of this invention.
Figure 2:
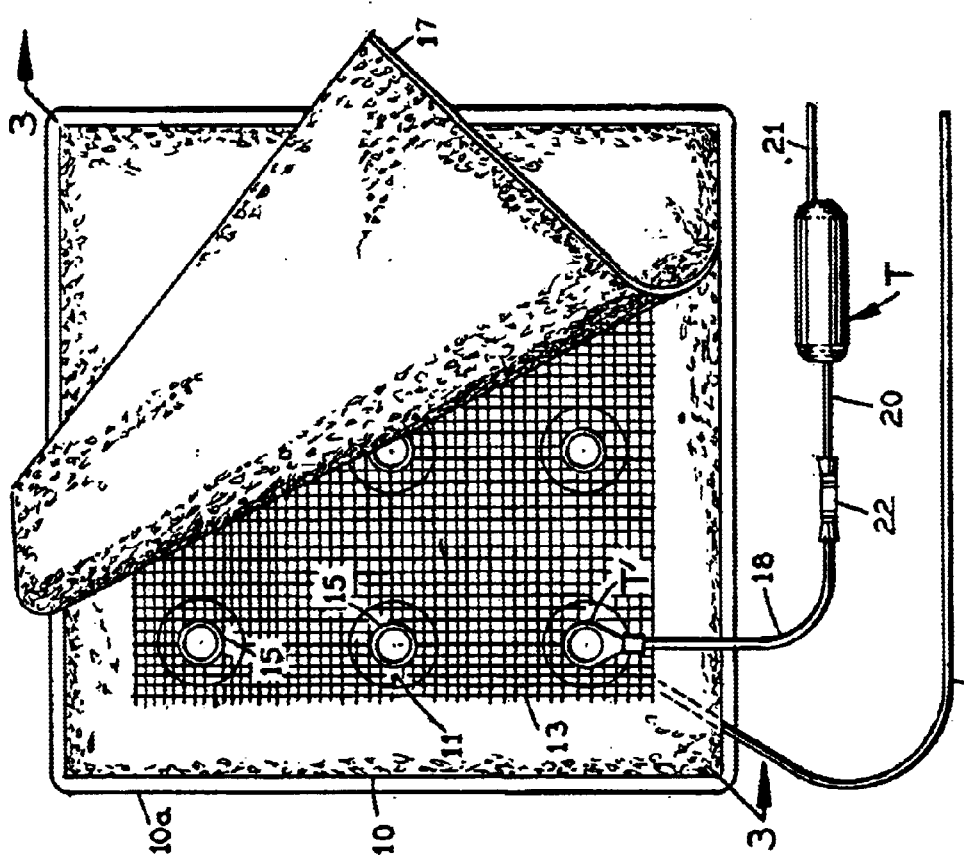
FIG. 2 is a top plan view showing part of the top cover pad of the seat switch component folded open to reveal upper switch contacts of the seat switch.

Referring to FIG. 3, the seat switch component of the present invention includes a seat switch with a relatively thick, apertured, central pad or cushion 10 of rectangular outline with flat top and bottom faces 10a and 10b, respectively. Pad 10 is of suitable compressible and resilient, dielectric, foam plastic or foam rubber, and it presents a plurality of spaced apart circular openings 11. A thin, flexible, foraminous sheet 12 of aluminum or other suitable electrically material overlies the top face 10a of the central pad 10 (FIG. 1) and is adhesively bonded to it. Similarly, an identical electrically conductive sheet 13 engages the bottom face 10b of the central pad (FIG. 2) and is adhesively attached to it. The upper sheet 12 carries a plurality of annular eyelets 14 of aluminum or other electrically conductive metal which project down into respective openings 11 in the central pad 10 at their upper ends. Likewise, the lower sheet 13 carries a plurality of identical electrically conductive eyelets 15 which project up into the respective openings 11 at their lower ends. These eyelets are the paired upper and lower switch contacts of the seat switch and they are normally spaced apart by the resilient central pad 10, i.e., in the absence of a person's weight on top of the seat switch component of this invention, as shown in FIG. 5. A relatively thin top cover pad 16 overlies the upper conductive sheet 12 of the seat switch, and a similar bottom cover pad 17 underlies the lower conductive sheet 13. Each off these cover pads preferably is of the same foam insulation as the central pad 10.

In addition to the seat switch per se, the seat switch component on the present invention includes first and second insulated, electrically conductive wires or leads 18 and 19, each carrying a terminal piece T on one end (FIGS. 2 and 4) that joins it to a corresponding upper or lower contact 14 or 15 of one pair in the seat switch proper. The free end of conductor 19 (i.e., the end away from the seat switch) is connected in the electrical circuit of the vehicle component or components controlled by the seat switch.

When a person sits on the seat in which this seat switch component is positioned, the weight of the person compresses the central pad 10 and causes the paired switch contacts 14 an 15 to engage each other (FIG. 6), thus closing an electrical circuit through the seat switch to control vehicle brakes or a parking brake, and/or seat belts, headlights, windshield wipers, or other electrically controlled components on the vehicle, as explained in the aforementioned patents to John G. Fontaine and William G. Fontaine.

In accordance with the present invention, a thermistor component of known design is connected in series with the above-described seat switch component 10–19. This thermistor component of the present combination includes a thermistor T and a pair of insulated electrically conductive wires or leads 20 and 21 joined directly to opposite terminals of thermistor T. The thermistor lead wire 20 is connected to the seat switch lead wire 18 through an insulated electrical connector 22 of known design that provides a low resistance electrical path between them and holds them securely in a permanent connection. The free end of conductor 21 (i.e., the end away from the seat switch) is connected to the electrical circuit for the vehicle component or components controlled by the seat switch. Accordingly, the seat switch component 10–19 and the thermistor component T, 20–21, together with the electrical connector 22 make up an integral combination or assembly that can be positioned as a unit in the driver's seat of a motor vehicle.

In the event of an overcurrent or overtemperature condition anywhere in the circuit in which the present seat switch and thermsitor assembly is connected, the brakes or other vehicle equipment controlled by seat switch 10–17 will respond as if the driver has gotten off the driver's seat. This notifies the driver that there is something wrong. Without disturbing the seat switch assembly in the driver's seat, the various parts of this circuit away from the seat switch can be inspected and/or tested to locate the short circuit or other malfunction that caused the seat switch to open. Only after these other possibilities have been exhausted will it be necessary to look into the seat switch as the possibly malfunctioning part of the circuit.

From the foregoing description and the accompanying drawings, it will be evident that the present seat switch assembly provides current overload protection in a unitary assembly that ordinarily does not have to be removed from the vehicle seat in the event of a current overload in the circuit controlled by the seat switch.

I claim:

1. A unitary seat switch assembly positionable in the driver's seat of a vehicle comprising: a seat switch component having a seat switch with paired normally-open switch contacts arranged to close under the weight of a person sitting in the driver's seat; and a thermistor component having a thermistor electrically connected to said seat switch component and responsive to a current overload to interrupt the current in a circuit containing the seat switch.

2. A unitary seat switch assembly according to claim 1 wherein said thermistor has a permanent electrical connection to said seat switch enabling the seat switch component and the thermistor component to be handled as a unit for positioning in the driver's seat of the vehicle.

3. A unitary seat switch assembly according to claim 2 wherein: said seat switch component has a pair of insulated electrical wires connected respectively to the paired switch contacts, one of said seat switch component wires extending from the seat switch for connection in the circuit containing the seat switch; and said thermistor component has a pair of insulated electrical wires connected respectively to opposite terminals of said thermistor, one of said thermistor component wires extending from the thermistor for connection in the circuit containing the seat switch;

and further comprising: an insulated electrical connector permanently joining the other wire of said seat switch component to the other wire of said thermistor component.

* * * * *